US012639888B2

(12) United States Patent
Liu et al.

(10) Patent No.: US 12,639,888 B2
(45) Date of Patent: May 26, 2026

(54) METHOD, ELECTRONIC DEVICE, AND PROGRAM PRODUCT FOR THREE-DIMENSIONAL MODELING

(71) Applicant: Dell Products L.P., Round Rock, TX (US)

(72) Inventors: Zhisong Liu, Shenzhen (CN); Zijia Wang, London (GB); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 18/444,074

(22) Filed: Feb. 16, 2024

(65) Prior Publication Data

US 2025/0245912 A1     Jul. 31, 2025

(51) Int. Cl.
*G06T 15/20*       (2011.01)
*G06T 15/08*       (2011.01)
*G06V 10/25*       (2022.01)

(52) U.S. Cl.
CPC ............ *G06T 15/205* (2013.01); *G06T 15/08* (2013.01); *G06V 10/25* (2022.01)

(58) Field of Classification Search
None
See application file for complete search history.

(56) References Cited

U.S. PATENT DOCUMENTS

| | | | | |
|---|---|---|---|---|
| 2020/0364862 | A1 * | 11/2020 | DaCosta | G06T 5/40 |
| 2023/0082499 | A1 * | 3/2023 | Usuda | G16H 50/20 |
| | | | | 378/146 |
| 2023/0260127 | A1 * | 8/2023 | Ben Baruch | G06T 7/194 |
| | | | | 345/633 |
| 2024/0096020 | A1 * | 3/2024 | Yu | G06T 7/194 |
| 2025/0166311 | A1 * | 5/2025 | Montero, Jr. | H04N 13/354 |

OTHER PUBLICATIONS

B. Mildenhall et al., "NeRF: Representing Scenes as Neural Radiance Fields for View Synthesis," European Conference on Computer Vision, Aug. 2020, 17 pages.
(Continued)

*Primary Examiner* — Peter Hoang
(74) *Attorney, Agent, or Firm* — Ryan, Mason & Lewis, LLP

(57)     ABSTRACT
An embodiment of the present disclosure provides a method for three-dimensional (3D) modeling. The method includes segmenting an image into a region of interest and a region of non-interest, and sending data associated with the region of interest to a server. The method further includes receiving a first 3D model corresponding to the region of interest from the server, the first 3D model being generated by a first neural network at the server; generating a second 3D model corresponding to the region of non-interest by a second neural network, the first neural network having more network parameters than the second neural network; and generating a 3D model corresponding to the image based on the first 3D model and the second 3D model. By using the method of an embodiment of the present disclosure, a processing speed of 3D modeling can be increased, and modeling quality and accuracy can be improved.

20 Claims, 7 Drawing Sheets

(56) References Cited

OTHER PUBLICATIONS

T. Müller et al., "Instant Neural Graphics Primitives with a Multiresolution Hash Encoding," arXiv:2201.05989v2, May 4, 2022, 15 pages.
J. T. Barron et al., "Mip-NeRF 360: Unbounded Anti-Aliased Neural Radiance Fields," Conference on Computer Vision and Pattern Recognition, arXiv:2111.12077v3, Mar. 25, 2022, 18 pages.
G. Gafni et al., "Dynamic Neural Radiance Fields for Monocular 4D Facial Avatar Reconstruction," IEEE/CVF Conference on Computer Vision and Pattern Recognition, Jun. 2021, pp. 8649-8658.
S. Liu et al., "Editing Conditional Radiance Fields," International Conference on Computer Vision, arXiv:2105.06466v2, Jun. 4, 2021, 24 pages.
C. Wang et al., "CLIP-NeRF: Text-and-Image Driven Manipulation of Neural Radiance Fields," arXiv:2112.05139v3, Mar. 2, 2022, 13 pages.
A. Radford et al., "Learning Transferable Visual Models From Natural Language Supervision," International Conference on Machine Learning, arXiv:2103.00020v1, Feb. 26, 2021, 48 pages.
S. Zhi et al., "In-Place Scene Labelling and Understanding with Implicit Scene Representation," International Conference on Computer Vision, arXiv:2103.15875v2, Aug. 21, 2021, 14 pages.
S. Kobayashi et al., "Decomposing NeRF for Editing via Feature Field Distillation," arXiv:2205.15585v1, May 31, 2022, 23 pages.

M. Boss et al., "NeRD: Neural Reflectance Decomposition from Image Collections," IEEE/CVF International Conference on Computer Vision (ICCV), Oct. 2021, pp. 12684-12694.
X. Zhang et al., "NeRFactor: Neural Factorization of Shape and Reflectance under an Unknown Illumination," ACM Transactions on Graphics, vol. 40, No. 6, Dec. 2021, pp. 237:1-237:18.
V. Rudnev et al., "NeRF for Outdoor Scene Relighting," 17th European Conference on Computer Vision, Oct. 2022, 17 pages.
Github, "tiny-cuda-nn," https://github.com/NVlabs/tiny-cuda-nn/blob/master/DOCUMENTATION.md, Accessed Dec. 20, 2023, 11 pages.
R. Li et al., "NerfAcc: A General NeRF Acceleration Toolbox," arXiv:2210.04847v3, May 10, 2023, 6 pages.
Github, "OpenMMLab Semantic Segmentation Toolbox and Benchmark," https://github.com/open-mmlab/mmsegmentation, Accessed Dec. 20, 2023, 8 pages.
Y. Yuan et al., "HRFormer: High-Resolution Transformer for Dense Prediction," arXiv:2110.09408v3, Nov. 7, 2021, 15 pages.
M. Tancik et al., "Nerfstudio: A Modular Framework for Neural Radiance Field Development," arXiv:2302.04264v4, Oct. 17, 2023, 13 pages.
Github, "Pretrain, Finetune and Deploy AI Models on Multiple GPUs, TPUs with Zero Code Changes," https://github.com/Lightning-Al/pytorch-lightning/tree/10914848504d758455d1b56fbae6e7c1b765bb90, Accessed Dec. 20, 2023, 8 pages.

* cited by examiner

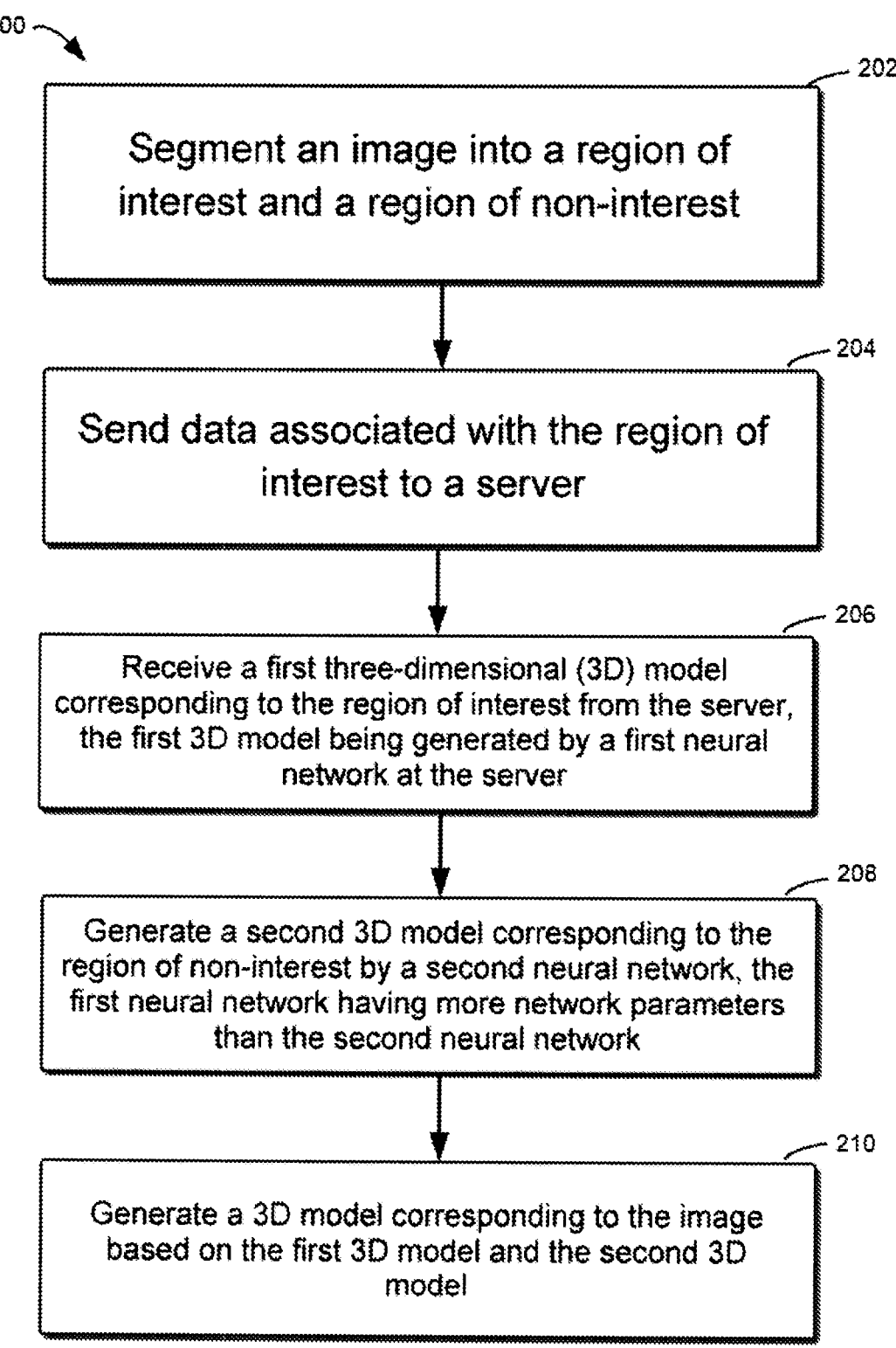

200

202

Segment an image into a region of interest and a region of non-interest

204

Send data associated with the region of interest to a server

206

Receive a first three-dimensional (3D) model corresponding to the region of interest from the server, the first 3D model being generated by a first neural network at the server

208

Generate a second 3D model corresponding to the region of non-interest by a second neural network, the first neural network having more network parameters than the second neural network

210

Generate a 3D model corresponding to the image based on the first 3D model and the second 3D model

METHOD, ELECTRONIC DEVICE, AND PROGRAM PRODUCT FOR THREE-DIMENSIONAL MODELING

RELATED APPLICATION

The present application claims priority to Chinese Patent Application No. 202410107438.3, filed Jan. 25, 2024, and entitled "Method, Electronic Device, and Program Product for Three-Dimensional Modeling," which is incorporated by reference herein in its entirety.

FIELD

Embodiments of the present disclosure relate to the field of computers, and more particularly, to a method, an electronic device, and a product for three-dimensional modeling.

BACKGROUND

Three-dimensional (3D) modeling is a process of using software to create a 3D digital representation of an object. In a 3D space, the object may be created and manipulated, to construct various types of outputs ranging from simple geometric shapes to complex visualized and animated models. This process is widely applied in multiple fields, including video game design, film production, architectural design, engineering, medicine, and the like.

For example, 3D modeling may be used in technologies such as the metaverse, which can provide users with highly realistic and enhanced experiences. Users should be able to access a metaverse application in any geographic location without worrying about computing and data access delays. Learning a 3D model from a two-dimensional (2D) image/video is an efficient method, which can easily elevate an image content into a 3D space. At present, high-performance graphics processing units (GPUs) have made significant progress in acceleration. Modeling and rendering from 2D to 3D can be achieved.

SUMMARY

Embodiments of the present disclosure provide a method, an electronic device, and a computer program product for 3D modeling.

According to a first aspect of the present disclosure, a method for 3D modeling is provided. The method includes segmenting an image into a region of interest and a region of non-interest, and sending data associated with the region of interest to a server. The method further includes receiving a first 3D model corresponding to the region of interest from the server, the first 3D model being generated by a first neural network at the server; generating a second 3D model corresponding to the region of non-interest by a second neural network, the first neural network having more network parameters than the second neural network; and generating a 3D model corresponding to the image based on the first 3D model and the second 3D model.

According to a second aspect of the present disclosure, an electronic device for determining 3D modeling is provided. The device includes at least one processor, and a memory coupled to the at least one processor and having instructions stored therein. The instructions, when executed by the at least one processor, cause the electronic device to perform actions. The actions include segmenting an image into a region of interest and a region of non-interest, and sending data associated with the region of interest to a server. The actions further include receiving a first 3D model corresponding to the region of interest from the server, the first 3D model being generated by a first neural network at the server; generating a second 3D model corresponding to the region of non-interest by a second neural network, the first neural network having more network parameters than the second neural network; and generating a 3D model corresponding to the image based on the first 3D model and the second 3D model.

According to a third aspect of the present disclosure, a computer program product is provided. The computer program product is tangibly stored on a non-transitory computer-readable medium and includes machine-executable instructions, wherein the machine-executable instructions, when executed by a machine, cause the machine to perform steps of the method implemented in the first aspect of the present disclosure.

BRIEF DESCRIPTION OF THE DRAWINGS

By the following Detailed Description of exemplary embodiments of the present disclosure, provided herein with reference to the accompanying drawings, the above and other objectives, features, and advantages of the present disclosure will become more apparent, wherein identical reference numerals generally represent identical element in the exemplary embodiments of the present disclosure, and in which:

FIG. 2 is a flow chart of a method for 3D modeling according to an embodiment of the present disclosure;

DETAILED DESCRIPTION

Illustrative embodiments of the present disclosure will be described below in further detail with reference to accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "at least partially based on." The term "an embodiment" or "the embodiment" should be understood as "at least one embodiment." The terms "first," "second," and the like may refer to different or identical objects. Other explicit and implicit definitions may also be included below.

Current processing of data associated with images by 2D-to-3D-based neural networks is extremely time-consuming, because such techniques do not maximize the utilization of computing power (such as CPUs, GPUs, and other resources) for acceleration. Many methods have poor performance on real-time rendering. Most of these methods are used to offline train neural networks and then render free view videos or 3D grids through offline computing, and therefore, such methods are more time-consuming and occupy more local resources. In addition, some methods do not differentiate collected image regions, resulting in a large amount of resources spent on rendering and drawing of each region. Excessive resource consumption may limit an ability of a system to process more complex tasks or larger datasets.

In order to solve at least the above and other potential problems, an embodiment of the present disclosure provides a method for 3D modeling. The method includes segmenting an image into a region of interest and a region of non-interest, and sending data associated with the region of interest to a server. The method further includes receiving a first 3D model corresponding to the region of interest from the server, the first 3D model being generated by a first neural network at the server; generating a second 3D model corresponding to the region of non-interest by a second neural network, the first neural network having more network parameters than the second neural network; and generating a 3D model corresponding to the image based on the first 3D model and the second 3D model. By using this method, a processing speed of 3D modeling can be increased, modeling quality and accuracy can be improved, and thus better and faster modeling is achieved.

Figure 1:
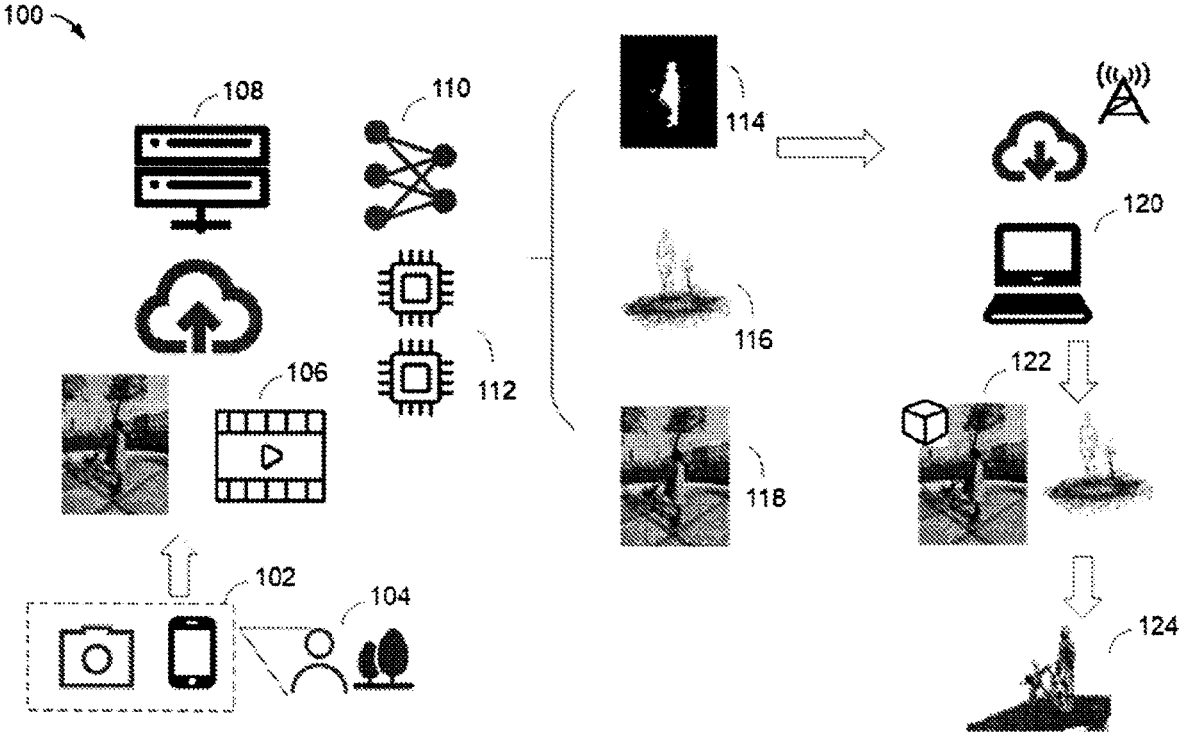
FIG. 1 is a schematic diagram of a system in which a device and/or a method of embodiments of the present disclosure may be implemented and used for 3D modeling according to an embodiment of the present disclosure.

Fundamental principles and several example embodiments of the present disclosure will be described in detail below with reference to the accompanying drawings. FIG. 1 is a schematic diagram of a system 100 in which a device and/or a method of an embodiment of the present disclosure may be implemented and used for 3D modeling according to an embodiment of the present disclosure. It should be understood that the number and arrangement of objects, components, and elements shown in FIG. 1 are only examples, and the schematic diagram may include components, elements and nodes, objects, and various additional elements with different numbers and arrangements.

As shown in FIG. 1, a user may use a terminal device 102 such as a mobile phone or a camera to capture relevant scenarios 104 including persons and backgrounds, and generate images and/or videos 106 corresponding to these scenarios. In some embodiments, the generated images and/or videos 106 may be pre-processed, such as image or video data conversion, video sampling, and upsampling and downsampling of the images or videos, adjusting a resolution of these data, and the like. For example, the terminal device 102 may convert image or video data into a format which is more suitable for processing, storage, or display through image or video data conversion. As an example, the terminal device 102 may convert an image of an RAM format into a JPEG or PNG format, or convert a video of an AVI format into an MP4 format. In this way, a file size may be reduced, or a color space may be converted to meet different display device requirements.

In some embodiments, the terminal device 102 may extract important frames or fragments from an original video through video sampling to reduce a data volume and highlight key contents. For example, sampling is performed according to a time interval (such as extracting one frame per second) or the importance of content changes (such as extracting the frames during scenario transition or occurrence of important events), so as to select specific frames.

Additionally or alternatively, in some embodiments, the terminal device 102 may increase the resolution of an image or video through upsampling of the image or video, so as to enhance details and definition. For example, interpolation methods, such as nearest neighbor interpolation, bilinear interpolation, and cubic interpolation, may be used for increasing the number of pixels. This is implemented by estimating and filling in color values of newly added pixels. In this way, image details can be enlarged, or video playback quality can be improved. In some embodiments, the terminal device 102 may further reduce the resolution of an image or video through downsampling of the image or video, so as to reduce a file size, facilitating storage and transmission between different devices or networks. For example, the terminal device 102 may selectively remove certain pixels or average neighboring pixels to remove the pixels, thereby optimizing the image and video to adapt to bandwidth and storage limitations.

The generated images and/or videos 106 and intermediate data may be uploaded to a server 108, which includes multiple neural networks, including neural network 110, that can be used for 3D modeling or drawing. According to some embodiments of the present disclosure, these neural networks may be arranged on multiple GPUs 112 for training, so as to provide a more stable and efficient audio and video processing ability. The multiple GPUs 112 contain several cores that can simultaneously process multiple computing task designs in parallel, especially the computing related to graphics and images, so that a processing speed is significantly increased, and training of the multiple neural networks is enhanced.

In some embodiments, the user may further select different ones of the multiple neural networks based on different GPU array configurations. For example, one or more of the multiple neural networks having a large number of GPU array configurations may be used for relatively complex and fine 3D modeling. For example, one or more of the multiple neural networks having higher than a specific GPU number threshold may be used for 3D modeling of persons, plants, clothing, textures, animal furs, and the like. However, one or more of the multiple neural networks having a small number of GPU array configurations or lower than a specific GPU number threshold may be used for relatively simple 3D modeling, such as roads and skies.

In some examples, the neural network 110 may comprise a deep learning model for 3D scenario reconstruction and rendering. For example, the neural network 110 is illustratively configured to reconstruct a 3D representation of successive scenarios by observing an image set shot or captured from multiple different angles. The neural network 110 may firstly use a series of 2D pictures shot from different angles as input. In some embodiments, the neural network 110 may further use a volume rendering technology to generate a 3D scenario, and consider an interaction of light rays with an object as they pass through the scenario, such as scattering, absorption, and other factors.

In some embodiments, the neural network 110 may represent the scenario based on a fully connected neural network. In a rendering process, the neural network 110 may perform sampling along light rays emitted from a virtual camera position to simulate light ray casting, and estimate colors and a volume density of these points. The neural network 110 may integrate the sampled colors and density subsequently, for example, the neural network 110 may integrate the color and density along each light ray to determine a final pixel value, and consider a cumulative effect of the light rays when passing through a space. Finally, the neural network 110 may output a 3D model of the scenario that may be observed from any new angle.

In some embodiments, the neural network 110 may be trained based on an image set shot from different angles. In a training process, the neural network 110 is enabled to better predict a 3D scenario corresponding to each input image through a mode of adjusting parameters of the neural network.

In some embodiments, the neural network 110 may apply background removal and object detection to the generated images and/or videos 106. For example, in some embodiments, the neural network 110 may select a region of interest (ROI) 114 by generating binary masking, where ROI 114 may include, for example, an object or set of objects of interest. Specifically, in some embodiments, the neural network 110 may separate ROI 114 from the image or video by removing or segmenting a background. In some embodiments, the neural network 110 may identify ROI 114 by comparing features, such as colors, textures, edges, and motion features in multiple images between the object or region of interest and multiple image regions of different parts of an ordinary background, so as to distinguish a foreground object and the background. In some embodiments, the neural network 110 may further separate a foreground and the background from the image through edge detection, threshold processing, and the like.

According to some embodiments of the present disclosure, the neural network 110 may further determine ROI 114 in a scenario based on matching of a template, matching of feature points, and other methods. Additionally or alternatively, in some embodiments, the neural network 110 may generate masking by creating a masking layer on the images and/or videos 106. For example, ROI 114 is marked as a value (such as a numerical value 1), other regions are marked as another value (such as a numerical value 0), and the regions which are marked as the other value are removed to achieve background removal, object detection, image segmentation, and the like.

Additionally or alternatively, in some embodiments, the neural network 110 may further convert a 2D image into a sparse point cloud 116. For example, the neural network 110 may further identify and extract key feature points in an uploaded image 118. The neural network 110 may further generate a disparity map to estimate depth information. The disparity map reflects disparity changes of the same scenario under different perspectives. As for a multi-perspective image, the neural network 110 may improve accuracy of depth estimation by fusing depth information of multiple perspectives.

Finally, the neural network 110 may convert pixels in the image into points in a 3D space according to the estimated depth information to form a point cloud. A position of each point may be determined according to a position and depth value of each point in the image. The neural network 110 finally may selectively extract key points from the generated point cloud to form a sparse point cloud. Additionally or alternatively, the neural network 110 may clean the generated point cloud to remove noise and irrelevant points, and may further smooth and optimize a generated point cloud model to improve quality. In some embodiments, the neural network 110 may merge the point cloud with other data sources of a point cloud generated by, such as a laser scanner, to improve accuracy and completeness.

According to an embodiment of the present disclosure, one or more trained versions of the multiple neural networks including neural network 110 and the generated 3D models may be sent or downloaded to a terminal device 120 the same as or different from the terminal device 102. In some embodiments, the terminal device 120 may be in communication connection with the server 108 through sockets, binding, and other modes to receive and send associated data. The 3D models for the ROI may further be fine-tuned at the terminal device 120, for example, image masking is applied to the 3D models to implement 3D model conversion.

According to an embodiment of the present disclosure, the terminal device 102 or the terminal device 120 may be any computing device with processing computing resources or storage resources. For example, the computing device may have common abilities, such as receiving and sending data requests, real-time data analysis, local data storage, and real-time network linkage. The computing device may typically include various types of devices. Examples of the computing device may include, but are not limited to: a database server, a rack server, a server cluster, a desktop computer, a laptop, a smartphone, a wearable device, a security device, a smart manufacturing device, a smart home device, an Internet of Things device, a smart car, an unmanned aerial vehicle, and the like, which is not limited in the present disclosure.

Additionally or alternatively, in some embodiments, online rendering 122 may be implemented through the modes of setting network IP and ports and broadcasting web links. In some embodiments, video drawing may be implemented through the modes of setting camera paths and offline drawing for customized videos. In some embodiments, point cloud drawing 124 may be implemented through the mode of grid reconstruction. The finally rendered 3D models (such as a point cloud or grids) may be shared by various 3D applications. In this way, according to an embodiment of the present disclosure, a complete automatic multi-stage framework may be implemented, 2D photos may be processed end-to-end to perform 3D modeling without the need for manual adjustment or tedious parameter settings. In some embodiments, a user-friendly ROI detection module may be provided, allowing a user to select a key component from the image to perform view rendering from coarse to fine. It brings multi-stage optimization to enhance key 3D object modeling and rendering.

The block diagram of an environment in which some embodiments of the present disclosure can be implemented has been described above in conjunction with FIG. 1. A flow chart of a method 200 for 3D modeling according to an embodiment of the present disclosure is described below in conjunction with FIG. 2. The method 200 may be executed at the terminal device 102 and/or 120 in FIG. 1.

At block 202, an image is segmented into a region of interest and a region of non-interest. According to an embodiment of the present disclosure, the terminal device 102 described in FIG. 1 may segment received image data or video data based on user selection or predetermined settings. For example, in some embodiments, the terminal device 102 may divide the image data or the video data into foreground data or background data based on data such as persons or objects selected or identified by a user in a screen and by generating binary masking. The foreground data refers to a region that the user is focused on or interested in, while the background data may refer to data that the user is less concerned about.

Additionally or alternatively, the terminal device 102 may determine the region of interest by comparing one or more of colors, textures, and edges of a plurality of different regions in an image. For example, a region is marked by identifying specific colors or color modes. For example, in a nature image, the terminal device 102 may identify a green region as trees, grasslands, or the like. In some embodiments, the terminal device 102 may position a region by identifying a texture mode in an image. The textures may be repetitive patterns or regions with specific directionality. In some other examples, the terminal device 102 may identify objects by identifying region boundaries with significant color or brightness changes.

At block 204, data associated with the region of interest is sent to a server. In some embodiments, the terminal device 102 may send the region of interest identified previously to the server 108. As an example, the region of interest may be objects such as persons, animals, clothing, hairs, and textures that the user is interested in or focused on. In some embodiments, the objects, such as the persons and animals in the image, may be identified by a target detection method (such as a target detection method based on deep learning). For a video or a successive image sequence, these objects may be continuously tracked by applying a target tracking technology. In some embodiments, a machine learning model may further be utilized to learn and predict an interest point of a user. This may be based on user historical interactions, image content analysis, or other relevant data. These regions that the user is more interested in may be more prioritized.

At block 206, a first 3D model corresponding to the region of interest is received from the server, and the first 3D model is generated by a first neural network at the server. The data associated with the region of interest may be processed by the first neural network. According to an embodiment of the present disclosure, the first neural network is deployed in one or more GPUs in the server. The multiple GPUs may effectively assist neural networks in processing parallel tasks, so as to process large-scale datasets or complex image data in a faster and more efficient manner.

According to an embodiment of the present disclosure, these neural networks may simulate propagation of light rays to generate a 3D model by using volume rendering based on an image set captured by the GPU from a plurality of angles. For example, the neural networks may firstly simulate the propagation of the light rays within a material (such as scattering and absorption) to generate multiple 2D images, and then the neural networks may reconstruct a detailed and accurate 3D scenario model from the multiple 2D images.

At block 208, a second 3D model corresponding to the region of non-interest is generated by a second neural network, and the first neural network has more network parameters than the second neural network. According to an embodiment of the present disclosure, the neural networks deployed on the GPUs in the terminal device 102 may process the segmented region of non-interest, so as to generate the corresponding 3D model, such as a background, a road, a sky, and other models. In some embodiments, these neural networks may further be trained and adjusted based on an image region selected by the user, and an image region not selected by the user.

According to an embodiment of the present disclosure, compared with the neural networks deployed on the GPUs in the terminal device 102, neural networks deployed on GPUs in the server 108 may have more adjustable parameters, a higher modeling speed, more available modeling resources, and the like. These neural networks or associated GPUs of server 108 and terminal device 102 may be dynamically scheduled and configured by task management based on factors, such as a data volume, task complexity, and hardware configuration, required for processing the region of interest and the region of non-interest, respectively.

At block 210, a 3D model corresponding to the image is generated based on the first 3D model and the second 3D model. According to an embodiment of the present disclosure, the terminal device 102 may combine the 3D models generated by different devices to generate a final 3D model. For example, the final 3D model may be determined according to a required computing amount, hardware configuration, and other different factors. In some embodiments, the terminal device 102 may determine the final 3D model only using locally computed and generated 3D models. In this case, the terminal device is completely responsible for a generation process of the 3D models. All data processing is performed locally, thereby shortening processing time caused by network latency.

In some embodiments, the terminal device 102 may combine the 3D models generated on a server side to generate the final 3D model. In this way, the final 3D model may be used for processing more complex tasks, and computing burdens between the local and the server are dynamically adjusted as needed. In some other embodiments, the terminal device 102 may further only invoke the neural networks deployed on the server side to generate the final 3D model, which reduces various requirements on the terminal device 102.

Additionally or alternatively, in some embodiments, the method according to the present disclosure may further be used for processing video data. For example, the terminal device 102 may segment a video into a region of interest video and a region of non-interest video. The terminal device 102 may receive 3D videos generated by the neural networks deployed on the server and corresponding to the region of interest video, and generate 3D videos corresponding to the region of non-interest video, and finally these 3D videos may be combined and spliced.

Figure 3:
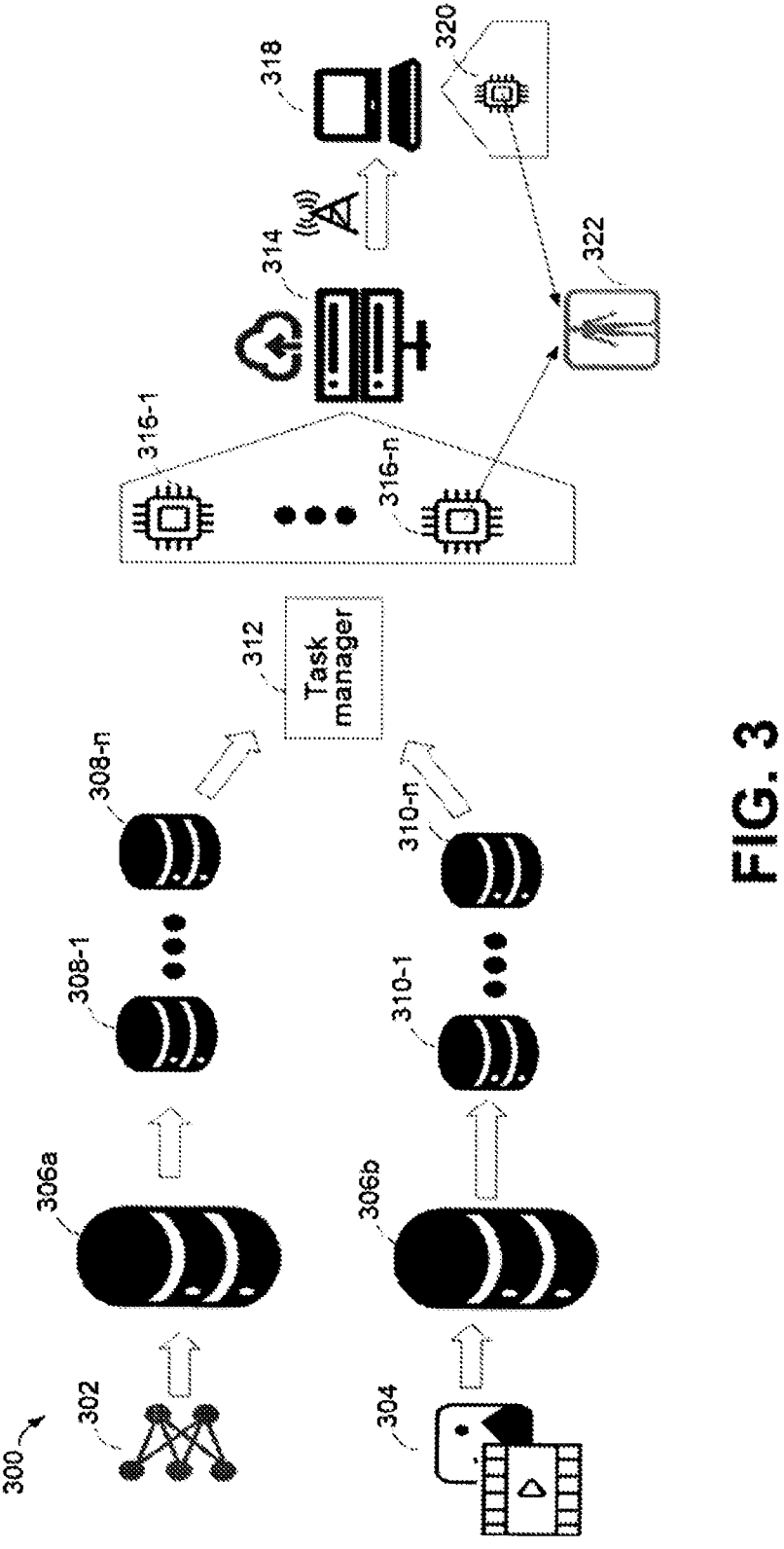
FIG. 3 is a schematic diagram of an architecture pattern of a multi-level neural network according to an embodiment of the present disclosure.

The flow chart of the method 200 for 3D modeling according to an embodiment of the present disclosure has been described above in conjunction with FIG. 2. A schematic diagram of an architecture pattern 300 of a multi-level neural network according to an embodiment of the present disclosure will be described below in conjunction with FIG. 3. According to an embodiment of the present disclosure, a training stage and a visualized rendering stage for the multi-level neural network may be included.

According to an embodiment of the present disclosure, multiple neural networks 302 may be firstly stored in a database 306a. Then, the multiple neural networks 302 may be replicated into N copies and stored in sub databases 308-1 to 308-n, respectively. Each replica neural network has the same neural network structure. Similarly, photos and videos 304 may also be stored in a database 306b. Then, the multiple neural networks 302 may be replicated into N copies, sampled into N batches of data through a random sampler, and stored in sub databases 310-1 to 310-n.

In some embodiments, the stored replica neural networks and the photos and/or videos may be managed and scheduled by a task manager 312. For example, the task manager 312 may deploy the replica neural networks on multiple GPUs, such as GPUs 316-1 to 316-n, on a cloud server 314. In some embodiments, the task manager 312 may split the neural networks and photo and video data into small tasks and encapsulate them for parallel training. For example, in the training stage, the task manager 312 may use multiple GPUs on a point cloud to train and accelerate the multiple replica neural networks.

In some embodiments, the task manager 312 may determine available resources and task complexity, including the number and performance of the GPUs on the server. The task manager 312 then may schedule and allocate rendering or modeling tasks to appropriate GPUs 316-1 to 316-n based on the resource availability and task requirements.

Additionally or alternatively, in some embodiments, the task manager 312 may limit the number of available GPUs for neural network initialization. For example, one neural network may correspond to one or more GPUs, or multiple neural networks may correspond to one GPU. The task manager 312 may dynamically schedule or determine an optimal corresponding relationship according to computing requirements of the replica neural networks and the computational power of the GPUs.

For example, in some embodiments, the task manager 312 may dynamically allocate the number of the GPUs according to the requirements of the rendering or modeling tasks and a use condition of current resources. For example, for the tasks requiring high computing resources, the task manager 312 may allocate more GPUs. Additionally or alternatively, in some embodiments, the task manager 312 may monitor a use condition and performance indicators of the GPUs in real time, thereby implementing performance monitoring and adjustment.

When the replica neural networks are deployed, the task manager 312 may need to consider load balancing to ensure a balanced utilization rate of each GPU and avoid a situation in which some GPUs are overloaded, while others are idle. In some embodiments, the task manager 312 may limit the number of the GPUs for neural network initialization, thereby helping optimize resource usage, especially in scenarios where processing resources are limited.

In some embodiments, the task manager 312 may further include a user interactive interface, which may provide the user with an interface to view a task state and a resource usage condition, and may be manually adjusted by the user when needed. In some embodiments, the task manager 312 may be a user feedback program, which may dynamically adjust resource management and task scheduling strategies according to specific needs of the user. In this way, the task manager 312 may ensure effective management and scheduling of the neural networks and relevant data thereof in a multi-GPU environment, so that a resource utilization rate is increased, a task processing speed is increased, and flexibility is provided to meet various computing needs.

In some embodiments, one or more trained neural networks deployed on the cloud server 314 may be transmitted into the terminal device 318 via network connection. The terminal device 318 then may deploy the one or more trained neural networks into a local GPU 320. According to an embodiment of the present disclosure, the GPUs 316-1 to 316-n deployed on the cloud server 314 may form a heterogeneous GPU with the local GPU 320 deployed in the terminal device 318.

These GPUs may be different sets of one or more GPUs with different types or performance specifications, for example, these GPUs may come from different manufacturers, with different architectures and different core numbers, computational power, processing speeds, memory capacities, or energy efficiency ratios. As for different application scenarios, the heterogeneous GPU may optimize the allocation of computing resources and allocate specific tasks to the most suitable GPU.

For example, according to some embodiments of the present disclosure, the 3D modeling tasks with dense details, such as persons, animals, hairs, textures, and clothing, may be processed by the GPUs 316-1 to 316-n deployed on the cloud server 314. These GPUs have higher processing speeds and larger memory bandwidths, and may continuously adjust a resource allocation strategy according to an actual running condition and performance feedback. In some embodiments of the present disclosure, the 3D modeling tasks with dense details may be regions of interest in images or videos specified by the user.

According to some embodiments of the present disclosure, the coarse 3D modeling tasks for backgrounds, roads, sky environments, and the like may be processed by the local GPU 320 deployed in the terminal device 318. These tasks typically do not need highly complex computing, and therefore, they are suitable for being performed on hardware with low performance. In some embodiments of the present disclosure, the coarse 3D modeling tasks may be regions of non-interest in the images or videos specified by the user. In some embodiments, a visualized website may also be provided to the user for directly observing a 360-degree view of a scenario. In some embodiments, the GPUs 316-1 to 316-n and the local GPU 320 may be in the same virtual environment to facilitate training and visualization. Finally, the 3D models rendered at the GPUs 316-1 to 316-n and the 3D models rendered at the local GPU 320 may be combined to form 3D model 322.

Figure 4:
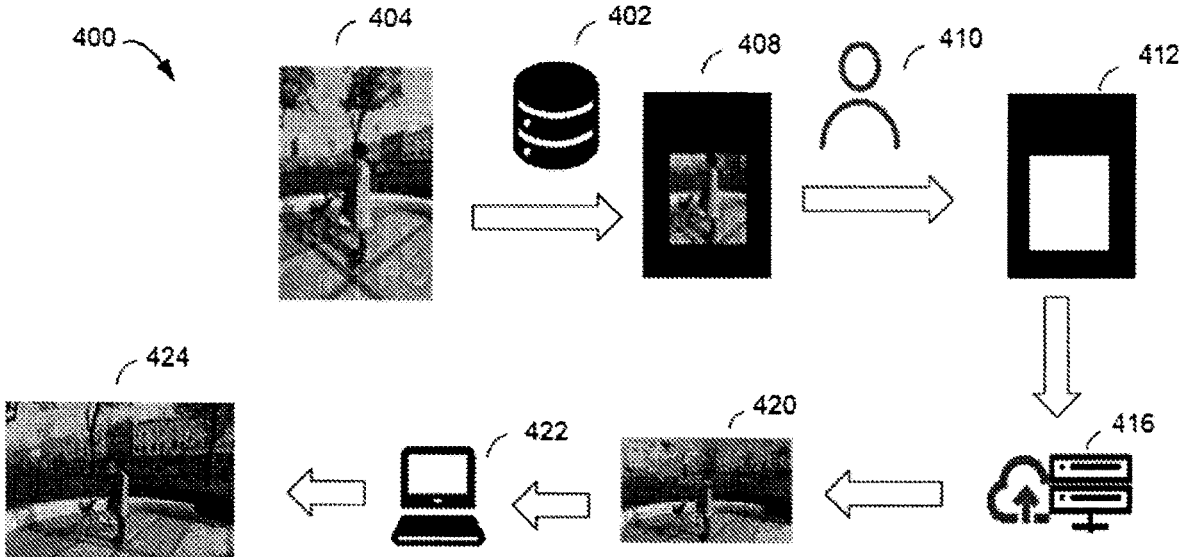
FIG. 4 is a schematic diagram of a region of interest based multi-stage training process for scenario segmentation according to an embodiment of the present disclosure.

FIG. 4 is a schematic diagram of an ROI-based multi-stage training process 400 for scenario segmentation according to an embodiment of the present disclosure. As shown in FIG. 4, according to some embodiments of the present disclosure, a scenario segmentation model 402 stored in a cloud server may segment an input image or video 404. In some embodiments, acquired segmented patterns may segment scenario contents in the image or video 404 into an F type representation 408 based on a pixel level.

In some examples, a user 410 may divide the segmented scenario contents into an ROI as a foreground pattern as needed, and take the remaining scenario contents as different pattern layers 412 of a background pattern. Binary masking may be generated based on selection of the user 410 to cover a background region. In some embodiments, the scenario segmentation model 402 may be any known or unknown segmentation model, and these models may detect vehicles, bicycles, persons, the ground, grasslands, and plant areas well. In some embodiments, multiple GPUs deployed on a server 416 may be used to train neural networks based on the background region and the ROI.

In this way, it may make the neural networks more focused on reconstruction of details 420 associated with the ROI. After training of the neural networks is completed, the neural networks may be downloaded and arranged into an edge device 422 such as a client, and the user may use their computers to refine the entire scenario in a very short period of time. In the ROI-based multi-stage training process, the ROI selected by the user may be trained and rendered on the server, other backgrounds will be refined in an edge computer, and finally a combined 3D rendering patten 424 including rendered persons and scenarios is generated. The neural networks may be selected according to speeds, quality, functions, and different scenarios of different neural networks.

Figure 5:
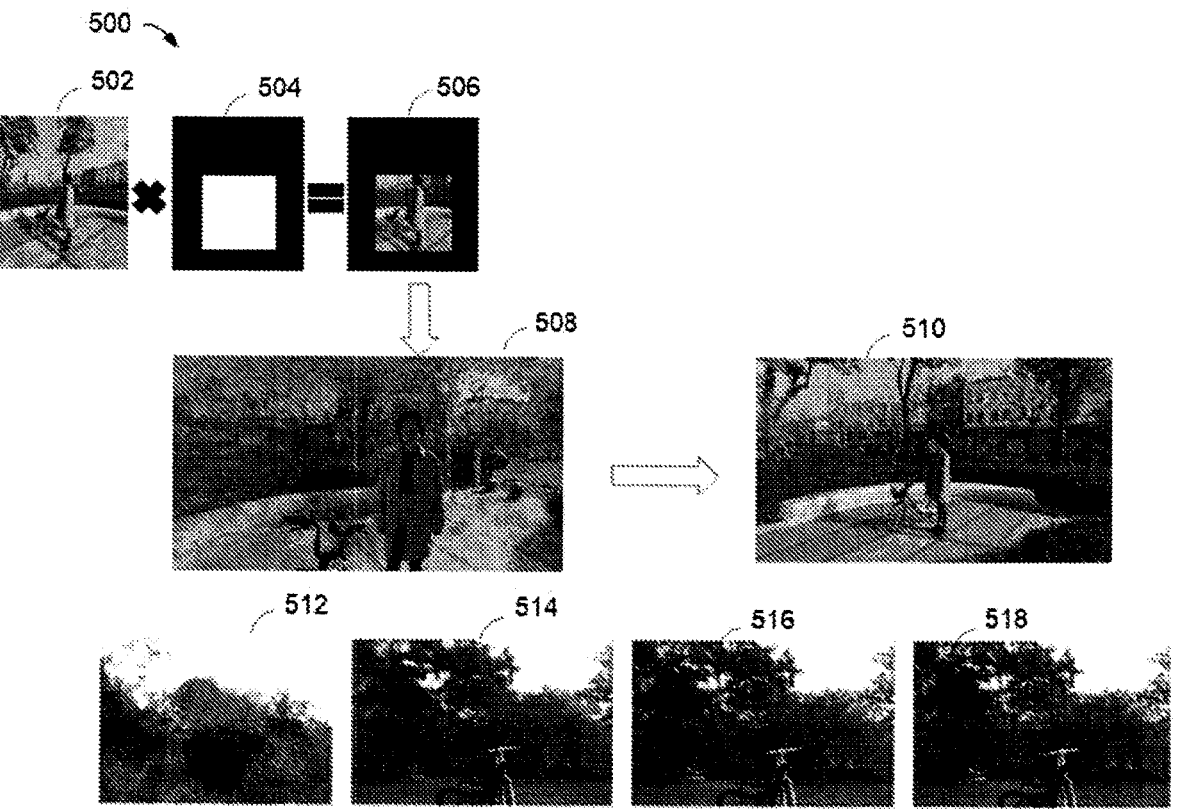
FIG. 5 is a schematic diagram of a multi-stage process for scenario modeling and rendering according to an embodiment of the present disclosure.

FIG. 5 is a schematic diagram of a multi-stage process 500 for scenario modeling and rendering according to an embodiment of the present disclosure. As shown in FIG. 5, external image or video data 502 may be determined as an ROI 506 and a background region based on a region 504 selected by a user. The ROI 506 that requires refining or fine-grained processing may be modeled and drawn by a GPU deployed in a server, utilizing ROI training on the cloud server as generally illustrated at 508, while the background region may be processed or fine-tuned at a user terminal, and the ROI 506 and the background region may be combined to finally generate a complete 3D model 510.

It may be seen that a person model has been well reconstructed since a stage of the ROI 506. In a combining stage, floating noise around the human body may be removed, and the background is refined to obtain good visual quality. Images 512 to 518 illustrate respective instances of an example scene utilizing different 3D models modeled and drawn based on different neural networks, respectively. These images show quantitative results of different methods on different GPUs.

Figure 6:
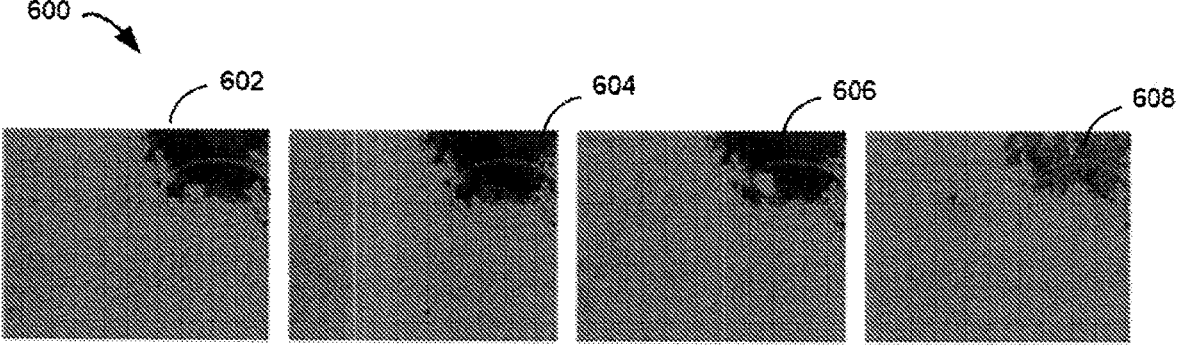
FIG. 6 shows a plurality of experimental result diagrams according to an embodiment of the present disclosure.

FIG. 6 shows a plurality of experimental result diagrams 600 according to an embodiment of the present disclosure. As shown in FIG. 6, FIGS. 602 to 608 illustrate result diagrams of an example scenario reconstructed 3D model with a resolution of 4K modeled and drawn based on different neural networks respectively, and show depth estimation between different methods. According to an embodiment of the present disclosure, a quantitative comparison may be performed in multiple different neural networks and may be provided to a user as a standard for use. The user or a manager may make corresponding improvements to specific scenario modeling and rendering.

Figure 7:
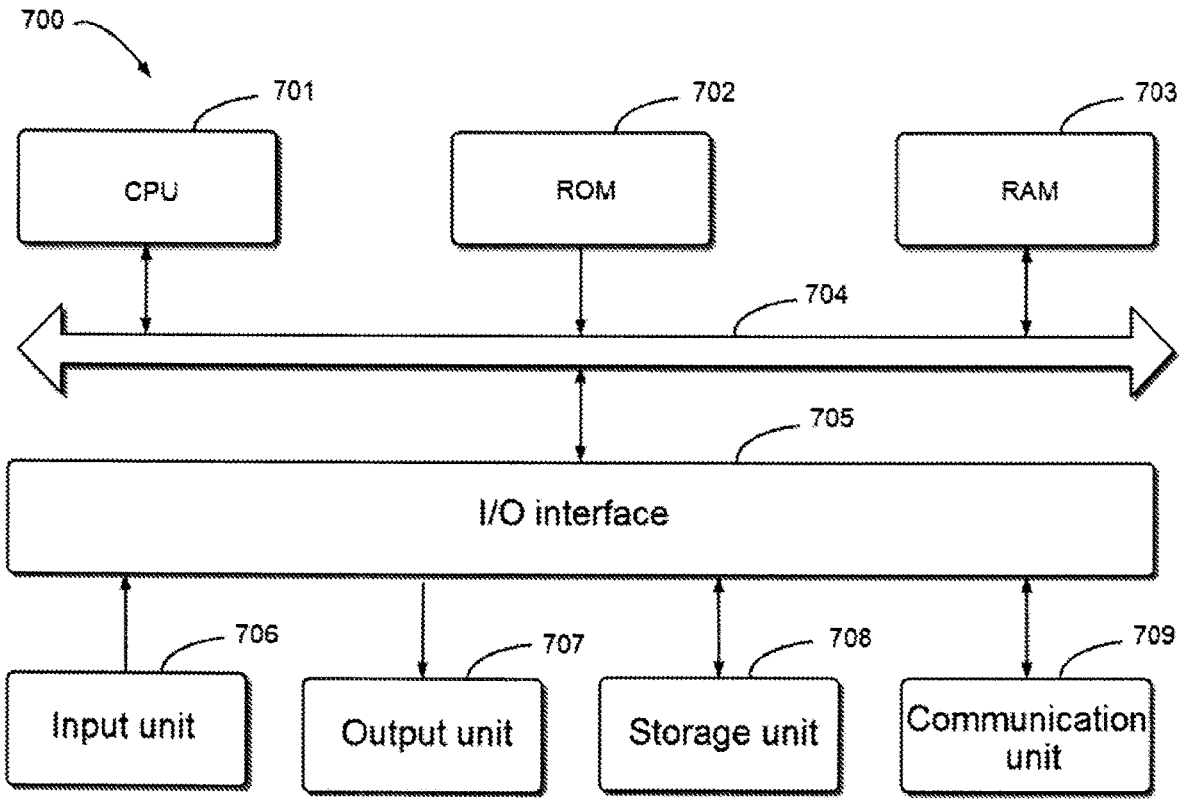
FIG. 7 is a block diagram of an example device which may be used for implementing embodiments of the present disclosure.

FIG. 7 is a block diagram of an example device 700 which may be used to implement embodiments of the present disclosure. The terminal device in FIG. 1 may be implemented using the device 700. As shown in the figure, the device 700 includes a central processing unit (CPU) 701 that may execute various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An input/output (I/O) interface 705 is also connected to the bus 704.

Multiple components in the device 700 are connected to the I/O interface 705, including: an input unit 706, such as a keyboard and a mouse; an output unit 707, such as various types of displays and speakers; the storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various processes and processing procedures described above, such as the method 200, may be executed by the CPU 701. For example, in some embodiments, the method 200 may be implemented as a computer software program that is tangibly included in a machine readable medium, such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more actions of the method 200 described above may be executed.

Illustrative embodiments of the present disclosure include a method, an apparatus, a system, and/or a computer program product. The computer program product may include a computer readable storage medium on which computer readable program instructions for executing various aspects of the present disclosure are loaded.

The computer readable storage medium may be a tangible device that may retain and store instructions used by an instruction-executing device. For example, the computer readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer readable program instructions described herein may be downloaded from a computer readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer readable program instructions from a network and forwards the computer readable program instructions for storage in a computer readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer readable program instructions. The electronic circuit may execute the computer readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer readable program instructions.

These computer readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer readable program instructions may also be stored in a computer readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method comprising:
   segmenting an image into a region of interest and a region of non-interest;
   sending, to a server, data associated with the region of interest, the server implementing a first neural network configured for processing the region of interest exclusive of at least portions of the region of non-interest, wherein a second neural network different from the first neural network is configured for processing the region of non-interest exclusive of at least portions of the region of interest, the second neural network being deployed at an edge device coupled to the server via a network, the first and second neural networks comprising respective first and second stages of a multi-stage processing framework, the first stage of the multi-stage processing framework comprising a first set of one or more acceleration processors of the server and the second stage of the multi-stage processing framework comprising a second set of one or more acceleration processors of the edge device, the second set being different than the first set, the first and second sets collectively providing a heterogeneous acceleration processor deployed across the server and the edge device;
   receiving, at the edge device from the server, a first three-dimensional (3D) model corresponding to the region of interest, the first 3D model being generated by the first neural network at the server;
   generating, by the second neural network at the edge device, a second 3D model corresponding to the region of non-interest, the first neural network having more network parameters than the second neural network; and
   generating, at the edge device, a 3D model corresponding to the image based on the first 3D model and the second 3D model.

2. The method according to claim 1, wherein the first neural network and the second neural network simulate propagation of light rays to generate the 3D model by using volume rendering based on an image set captured from a plurality of angles.

3. The method according to claim 1, wherein segmenting the image into the region of interest and the region of non-interest comprises:
   segmenting the region of interest and the region of non-interest by generating binary masking based on user selection and identification.

4. The method according to claim 1, wherein segmenting the image into the region of interest and the region of non-interest comprises:
   determining the region of interest by comparing one or more of colors, textures, and edges of a plurality of different regions in the image.

5. The method according to claim 1, wherein the first neural network is deployed in one or more graphics processing units (GPUs) in the server;

the second neural network is deployed in one or more GPUs in a terminal device; and the one or more GPUs in the server and the one or more GPUs in the terminal device are dynamically scheduled and configured by task management based on one or more of a data volume, task complexity, and hardware configuration factors required for processing the region of interest and the region of non-interest, respectively.

6. The method according to claim 1, wherein the first neural network is used for rendering and reconstructing the region of interest, and the second neural network is used for rendering and reconstructing the region of non-interest.

7. The method according to claim 3, wherein the first neural network is trained and adjusted based on an image region selected by the user, and the second neural network is trained and adjusted based on an image region not selected by the user.

8. The method according to claim 1, further comprising:

segmenting a video into a region of interest video and a region of non-interest video; and receiving a first 3D video generated by the first neural network and corresponding to the region of interest video.

9. The method according to claim 8, further comprising:

generating, by the second neural network, a second 3D video corresponding to the region of non-interest video; and generating a 3D video corresponding to the video based on the first 3D video and the second 3D video.

10. An electronic device, comprising:

at least one processor; and memory, coupled to the at least one processor and having instructions stored therein, wherein the instructions, when executed by the at least one processor, cause the electronic device to perform actions, comprising:

segmenting an image into a region of interest and a region of non-interest;

sending, to a server, data associated with the region of interest, the server implementing a first neural network configured for processing the region of interest exclusive of at least portions of the region of non-interest, wherein a second neural network different from the first neural network is configured for processing the region of non-interest exclusive of at least portions of the region of interest, the second neural network being deployed at an edge device coupled to the server via a network, the first and second neural networks comprising respective first and second stages of a multi-stage processing framework, the first stage of the multi-stage processing framework comprising a first set of one or more acceleration processors of the server and the second stage of the multi-stage processing framework comprising a second set of one or more acceleration processors of the edge device, the second set being different than the first set, the first and second sets collectively providing a heterogeneous acceleration processor deployed across the server and the edge device;

receiving, at the edge device from the server, a first three-dimensional (3D) model corresponding to the region of interest, the first 3D model being generated by the first neural network at the server;

generating, by the second neural network at the edge device, a second 3D model corresponding to the region of non-interest, the first neural network having more network parameters than the second neural network; and generating, at the edge device, a 3D model corresponding to the image based on the first 3D model and the second 3D model.

11. The electronic device according to claim 10, wherein the first neural network and the second neural network simulate propagation of light rays to generate the 3D model by using volume rendering based on an image set captured from a plurality of angles.

12. The electronic device according to claim 10, wherein segmenting the image into the region of interest and the region of non-interest comprises:

segmenting the region of interest and the region of non-interest by generating binary masking based on user selection and identification.

13. The electronic device according to claim 10, wherein segmenting the image into the region of interest and the region of non-interest comprises:

determining the region of interest by comparing one or more of colors, textures, and edges of a plurality of different regions in the image.

14. The electronic device according to claim 10, wherein the first neural network is deployed in one or more graphics processing units (GPUs) in the server;

the second neural network is deployed in one or more GPUs in a terminal device; and the one or more GPUs in the server and the one or more GPUs in the terminal device are dynamically scheduled and configured by task management based on one or more of a data volume, task complexity, and hardware configuration factors required for processing the region of interest and the region of non-interest, respectively.

15. The electronic device according to claim 10, wherein the first neural network is used for rendering and reconstructing the region of interest, and the second neural network is used for rendering and reconstructing the region of non-interest.

16. The electronic device according to claim 12, wherein the first neural network is trained and adjusted based on an image region selected by the user, and the second neural network is trained and adjusted based on an image region not selected by the user.

17. The electronic device according to claim 10, further comprising:

segmenting a video into a region of interest video and a region of non-interest video; and receiving a first 3D video generated by the first neural network and corresponding to the region of interest video.

18. The electronic device according to claim 17, further comprising:

generating, by the second neural network, a second 3D video corresponding to the region of non-interest video; and generating a 3D video corresponding to the video based on the first 3D video and the second 3D video.

19. A computer program product comprising a non-transitory computer-readable medium having machine-executable instructions stored therein, wherein the machine-executable instructions, when executed by a machine, cause the machine to perform actions comprising:

segmenting an image into a region of interest and a region of non-interest;

sending data associated with the region of interest to a server, the server implementing a first neural network configured for processing the region of interest exclusive of at least portions of the region of non-interest, wherein a second neural network different from the first neural network is configured for processing the region of non-interest exclusive of at least portions of the region of interest, the second neural network being deployed at an edge device coupled to the server via a network, the first and second neural networks comprising respective first and second stages of a multi-stage processing framework, the first stage of the multi-stage processing framework comprising a first set of one or more acceleration processors of the server and the second stage of the multi-stage processing framework comprising a second set of one or more acceleration processors of the edge device, the second set being different than the first set, the first and second sets collectively providing a heterogeneous acceleration processor deployed across the server and the edge device;

receiving, at the edge device, a first three-dimensional (3D) model corresponding to the region of interest from the server, the first 3D model being generated by the first neural network at the server;

generating, at the edge device, a second 3D model corresponding to the region of non-interest by the second neural network, the first neural network having more network parameters than the second neural network; and generating, at the edge device, a 3D model corresponding to the image based on the first 3D model and the second 3D model.

20. The computer program product according to claim 19, wherein the first neural network and the second neural network simulate propagation of light rays to generate the 3D model by using volume rendering based on an image set captured from a plurality of angles.

* * * * *